United States Patent Office 3,309,260
Patented Mar. 14, 1967

3,309,260
COMPOSITE FILM-FABRIC ELECTRICAL
INSULATING SHEET
Alvin W. Boese, St. Paul, Minn., assignor to Minnesota Mining and Manufacturing Company, St. Paul, Minn., a corporation of Delaware
No Drawing. Filed Feb. 19, 1960, Ser. No. 9,674
12 Claims. (Cl. 161—150)

This application is a continuation-in-part of my co-pending application Ser. No. 532,369, filed Sept. 2, 1955, now abandoned.

This invention particularly relates to a composite film-fabric sheet having exceptional utility for electrical insulation purposes, which sheet comprises an improved nonwoven fabric and a film of electrical insulating resin inseparably united to the fabric.

The improved fabric is composed of a mixture of two different types of staple polyester fibers which are combined together into a unified flexible web without need of using extraneous adhesives or bonding agents. The fabric is not a "paper" in the usual sense and its manufacture does not require the employment of paper-making procedure or paper-making fibers. The fiber structure as a whole, and the relationship of the individual fibers, are quite different from those of previously known nonwoven fabrics and those of woven cloths, with resultant outstanding advantages in respect to usage for electrical insulation purposes.

The fabric has a porous open structure in which the relatively long staple fibers are heterogeneously mixed and contact each other only at their crossing points, being otherwise free from contact along their axes. This makes not only for greater flexibility but provides a fabric in which a high percentage of the individual fiber surfaces can be contacted by an impregnant. The fabric is well adapted for impregnation by electrical insulating varnishes and has a high "pick up ratio" (ratio of impregnant weight to fiber weight). The structure permits of free access to substantially the compete surface area of each fiber and avoids the possibility of air being trapped.

This is in contrast to the structure of woven cloths formed of threads composed of twisted fibers spun together, wherein the fibers of each thread contact each other along theinr axes, and air can be trapped in amongst the fibers. The present fabric can be impregnated with polymeric resin varnish prior to use to provide a varnished fabric type of insulation, and such manufactured products are embraced by the invention. The term "varnish" is employed in its broad sense and is not restricted to oleo-resinous varnishes. The varnish impregnant can be a soft and stretchable polymer composition, such as a heat-curing polyester or epoxy resin composition, which is adapted to be fully "cured" at a subsequent time by heating the impregnated fabric after application, for instance, after the winding of a coil with impregnated tape.

A further feature of the present nonwoven fabric is that it can be slit into ribbons or tapes having a precise width and having non-ravelling edges. Such tapes when impregnated with a stretchable resin are stretchable to the extent of at least about 20% without rupturing. They lend themselves to the winding of coils and other objects with good conformation. Moreover, the structure limits fiber motion to the area required for obtaining conformation. In contrast, a woven tape has less elongation ability (about 6.5% in the case of woven cotton tapes) and the woven structure requires bundles of fibers (yarns or threads) to move over considerable distances in seeking conformation. Conformation with minimum fiber motion is desirable in order to minimize loss of continuity of an impregnant.

In the presently preferred form of the invention all of the fibers of the improved fabric are formed of the same identical chemical composition e.g. polyethylene terephthalate polyester. This identity of chemical composition is of particular advantage in the field of electrical insulation, it being effective to minify electrical stress gradients at the interfaces between adjacent fibers. It has the further advantage of affording a fabric in which all of the fibers have substantially the same dielectric constant. Polyester fibers have excellent electrical insulating properties, are non-corrosive and substantially non-hygroscopic, are insouble in oils and common organic solvents, and have good thermal properties and stability, as well as high resistance to deterioration. Although these characteristics of polyester were previously known, the utilization of polyester fibers in self-unified nonwoven fabrics as herein described is believed to be an innovation of the present invention.

An important feature of the present nonwoven fabric is that it can be formed as a single ply, or as a component of an autogenously bonded laminate including one or more other sheets which may take the form of like fabrics, webs of unidirectional continuous filament polymeric yarns, woven webs, or preformed polymeric films, all preferably of the same chemical composition for the reasons aforedescribed. A composite flexible film-fabric sheet or tape of such laminated construction has excellent properties for electrical insulation usages, as for instance for slot insulation, with or without impregnation. These laminated products are all embraced by the invention.

My novel composite film-fabric sheet comprises one or more plies of a self-unified tissue-like fabric formed of a compacted carded mixture of interlaced staple bonding and structural fibers which both preferably have a length of at least approximately one inch. The bonding fibers are of thermoplastic polyester material and are initially in a substantially amorphous state. As a result of the application of heat and pressure in the formation of the improved fabric by the improved method to be described in detail hereinafter, the bonding fibers soften and autogenously bond to each other and to the structural fibers at their crossing points without the use of an extraneous adhesive agent. The temperature at which the bonding is effected is substantially below that which would soften or otherwise affect the structural fibers which are therefore substantially unaffected by the heat application referred to. The application of heat as required in carrying out the improved method effects, following the bonding aforementioned, sequential crystallization of the amorphous bonding fibers. Crystallization substantially raises the softening temperature range of the bonding fibers so that the finished fabric will withstand temperatures substantially higher than the softening temperature range of the bonding fibers in their initial amorphous state. Crystallization of the amorphous bonding fibers renders said bonding fibers substantially less susceptible to moisture absorption than said fibers were in their initial amorphous state and thus affords this further advantage over fabrics based on amorphous fibers.

In forming the improved fabric entirely of fibers of the same polyester, the desired result is obtained by starting with a carded mixture of "undrawn" amorphous unoriented bonding fibers and "drawn," i.e. crystalline, oriented structural fibers, each being present in the proportion of about 40 to 60% by weight (based on a total of 100%). Although both types of fibers are formed of the same polyester and neither is plasticized, the desired result is obtainable because use is made of amorphous "undrawn" fibers which inherently have a softening temperature range which is below the temperature range within which the "drawn" fibers soften and melt.

"Polyester" fibers are well known by that designation in the synthetic textile fiber trade and are commercially available. They may be formed by melting and extruding through spinnerets a high molecular weight linear polyester of a dihydric alcohol and a dicarboxylic aromatic acid. The extruded amorphous filaments are subjected to drawing (stretching) in manufacturing the regular commercial product; the drawn filaments having a higher softening temperature and increased tensile strength and elasticity, and decreased stretchability, resulting from orientation of the polymer molecules in the direction of the fiber axis and the development of crystallinity. Continuous fiber filaments are chopped to produce staple fibers. As noted, the commercial product (whether sold in the form of continuous filament yarns or as staple fibers) is of this drawn type, and it alone possesses the combination of properties desired for conventional textile usage.

As aforeindicated, the "undrawn" type of polyester fiber is an intermediate product which is amorphous (non-crystalline) and has a non-oriented molecular structure. So far as I am aware, it had not been produced as an end product for commercial usage prior to my invention, although considerable quantities were accumulated as waste material in the course of manufacturing the "drawn" type constituting the usual desired end product. This waste material was commonly discarded or sold as scrap. Continuous filaments thereof can be chopped into staple fibers and these are utilized in fabricating my product.

Polyester fiber is manufactured in the United States by the Du Pont Company and sold under the trademark "Dacron." It is produced from a polyester of ethylene glycol and terephthalic acid and has been subjected to drawing. Fibers of the commercial "drawn" type polyester cannot be employed as the sole fiber constituent of my nonwoven fabric, however. The softening point of "Dacron" polyester fiber is approximately 480° F. (250° C.) and the temperature range over which the fiber softens and melts is very narrow. This makes it impossible to autogenously interbond the fibers in a satisfactory manner by heating and pressing—for the fibers either will not be softened so that they can fuse together or else they will be so plastic that they will become mashed.

Polyester fibers of the amporhous "undrawn" type also cannot be employed as the sole fiber constituent of my nonwoven fabric. These fibers, such as those made from undrawn filaments produced intermediately in the manufacture of "Dacron" fibers, have a thermal softening characteristic that would result in excessive mashing when subjected to heating and pressing that is adequate to firmly fuse together the fibers at their crossing points. Moreover, these fibers, being unoriented, lack the necessary strength to serve as structural fibers and are extremly frangible. The amorphous undrawn type of fiber made from intermediate undrawn "Dacron" polyester filaments has a wide softening range of approximately 300 to 450° F. (150 to 230° C.) within which satisfactory autogenous bonding can be obtained. This range is below the temperature range within which the drawn type of fiber softens and melts.

A carded tissue-like mixture of the two types of fibers can be unified by heating and pressing so as to autogenously bond the amorphous undrawn bonding fibers to each other and to the drawn structural fibers at their crossing points without mashing any of the fibers; each type being present in the proportion of about 40 to 60% by weight. If the proportion of amorphous undrawn fibers is substantially less than 40% there will be inadequate unification of the fabric structure. If the proportion of undrawn amorphous fibers is substantially greater than 60%, the fabric will have too much stiffness and inadequate strength and elasticity.

Microscopic examination shows that in addition to the autogenous bonding which is effected by the bonding fibers during the heating and pressing operation, another phenomenon unexpectedly occurs. Whereas the bonding fibers are initially amorphous in character, said fibers, after effecting the bonding aforementioned, undergo crystallization as a further result of the applied heat. Microscopic examination indicates that in the finished fabric the crystalline bonding fibers make their principal contribution as a means for interbonding the structural fibers crossed thereby. The resulting bond has remarkable strength, particularly when it is realized that the bonding medium is crystalline in character and highly frangible. Even when the fabric is subjected to repeated rumpling sufficient to fracture the frangible bonding fibers between the bonds for the structural fibers, the bonds remain intact and the fabric, though now more flexible and conformable, retains most of its initial strength. Moreover, tests have shown that the softening temperature range of the bonding fibers in the finished fabric is typical of crystalline, rather than amorphous polymer. Whereas there is a substantial difference in the softening temperature ranges of the bonding fibers in their initial amorphous state and the crystalline oriented structural fibers, in the finished fabric the bonding fibers and the structural fibers have substantially the same softening temperature range when made of the same chemical composition.

A typical single-ply fabric product has a ream weight of 15 pounds (weight of 320 square yards). A two-ply unified fabric, having a ream weight of 30 pounds, can be readily manufactured by laminating a previously made unified single-ply fabric with a second carded web or bat by simultaneous heating and pressing which internally unifies the second web and unifies it to the first fabric due to bonding by the amorphous undrawn fibers of the second web at their points of contact with the first fabric. This two-ply fabric can then be made into a three-ply fabric, and so on, by repetition of the process. The products of principal interest are those consisting of one to four plies, having ream weights of about 15 to 60 pounds, respectively. For electrical insulation tapes, two-ply and three-ply structures are presently preferred, having ream weights of about 30 and 45 pounds, respectively.

The fabric product can be treated with a dilute solution or emulsion in a volatile vehicle of a coating material which upon drying will provide superficial impregnation by a waterproof insulating varnish, forming a thin sizing coating on the fibers, so as to obtain a modified fibrous fabric product that is still adequately porous, stretchable and comfortable. An example is an aqueous emulsion of polyester monomer containing a polymerization catalyst which will dry and set-up on heating of the impregnated fabric to provide a sizing on the fibers of polyester varnish. The sizing eliminates any tendency to fuziness and increases the tensile strength.

Complete impregnation of the porous fabric, whether or not previously given a sizing treatment, with any suitable electrical insulating varnish, results in a flexible varnished insulating fabric having desirable properties attributable both to the characteristics of the fibrous fabric and to the relatively high proportion of varnish relative to the volume or weight of the fibers. Similarly, if a fabric tape is employed for winding on electrical coils, for example, subsequent impregnation with insulating varnish results in a desirable insulating covering due to the combination of favorable factors.

Process of making

The apparatus employed for making my nonwoven fibrous fabric in continuous fashion includes a carding machine to straighten out, mix and intermingle the fibers and form a carded tissue-like web or bat thereof in which the fibers are preferably disposed in random orientation, though they may be otherwise as suitable and desired. A rotating heated drum is provided with suitable pressing rolls which subject the carded web to heating and pressing adapted to compact the fibrous structure and cause the undrawn polyester fibers to become autogenously bonded as aforedescribed so as to unify the structure and also to effect the aforementioned sequential crystallization of the undrawn fibers. A wind-up mechanism is also provided for winding the finished web into rolls. In addition means are provided for feeding a previously made sheet, such as a preformed woven or nonwoven polyester fabric or an oriented polyester film from a roll thereof so as to lie on top of a carded web or bat as it is carried by the rotating heating drum, thereby building up a multi-ply fabric or a film-fiber composite by lamination.

By a carding machine is meant not only those which are technically termed carding machines, but also Garnett machines and other which operate to form carded webs. The carding precedure straightens out the fibers and forms a loose open-mesh fluffy web of non-parallel interlaced fibers which pass over and under each other in a heterogeneous fashion. Each fiber is crossed by numerous other fibers along its length. The mixture of fibers is preferably prepared for carding by throwing the fibers, in the desired relative proportion, into a "picker" which blends the mixture and opens the fibers.

The heating drum with its pressing rolls exerts a light-pressure soft-roll pressing action upon the carded web which is entirely different from the pressure effect produced by the calendars used in textile mills, which have hard rolls forming the nips through which sheet material is passed under heavy pressure. A gentle pressing is essential to prevent mashing of the softened fibers.

The heating drum which I have employed is a horizontal polished steel drum having a diameter of 30 inches and a length of 66 inches to handle a web 60 inches wide. It is internally heated to provide a surface temperature in the range of 420 to 445° F. It is rotated at a speed of approximately 7.65 r.p.m. so as to have a peripheral speed of 60 feet per minute, thereby producing the product at the rate of 1,200 yards per hour. There are two horizontal pressing rolls mounted so as to bear against the heating drum, spaced apart by a distance approximately two-thirds the periphery. The carded web from the carding machine is fed into the nip between the first pressing roll and the drum and then travels along in contact with the surface of the rotating drum until it passes through the nip between the second pressing roll and the drum, involving a travel distance of approximately two-thirds the periphery of the drum. The web is drawn up and around the latter roll and is thus separated from the surface of the heating drum; the resultant heat-pressed fabric being pulled by pull rolls through which it passes en route to a wind-up roll. Stripping of the fabric from the drum may be facilitated by a thin coating of silicone parting agent on the surface of the drum.

The movable pressing rolls are hollow steel cylinders having a diameter of 5 inches and mounted in bearings so as to freely turn, and the desired pressure is exerted upon the bearings through air-activated cylinders, the pressure being controlled by control of the air pressure. The second pressing roll is covered with 20 turns of smooth glass cloth wound on in a direction so that the outer end will trail through the nip. The glass cloth provides a soft flexible surface which will not stick to the heated web and furnishes a substantial contact area at the nip. No covering is needed on the first pressing roll, this roll this roll serving to compact the fluffy carded web and holding the trailing portion of the web in good contact with the rotating drum as the web travels toward the nip of the second roll.

In typical manufacturing operations, the total pressure on the first pressing roll has been maintained at about 250 pounds (which is slightly more than 4 pounds per inch width of the web); while the total pressure on the second roll has been in the range of 250 to 1,000 pounds, depending on conditions.

In making a two-ply product the procedure is the same except that a previously manufactured one-ply bonded fabric is also fed into the first pressing roll nip, so as to overlie the web from the carding machine, the latter contacting the surface of the heating drum. The drum temperature is increased about 15° F. and the pressing roll pressures are also increased somewhat, so as to insure interbonding of the web to the previously manufactured one-ply fabric. Similarly in making a three-ply or four-ply product, a two-ply or three-ply bonded fabric is fed into the first pressing roll nip along with the unbonded web from the carding machine, thereby adding one ply and simultaneously bonding or unifying the web from the carding machine.

Final adjustments of temperature and pressures during manufacturing are made so that the product has the desired structure, which is readily ascertainable by inspection.

Example

Typical preferred types of product for electrical insulation usage are two-ply and three-ply polyester fiber fabrics manufactured in the manner just described and consisting of equal parts by weight of drawn "Dacron" staple fibers (1½ inch average length and 1½ denier size) and of undrawn polyester staple fibers (1¼ inch average length) chopped from filaments produced in the "Dacron" manufacturing operation but not subjected to the drawing procedure. These latter fibers have a diameter of 1 to 2 mils, which is approximately twice that of the corresponding drawn fibers.

One resultant two-ply product has a ream weight of 30 pounds (weight of 320 square yards), corresponding to 1.5 oz./sq. yd. The caliper thickness averages approximately 6.5 mils. The lengthwise tensile strength is at least 4 pounds per inch width and the crosswise tensile strength is approximately 1 pound (this difference being due to the fact that the lengthwise components of fiber direction in the particular web tested exceed the crosswise components in total magnitude). The elongation before rupture is 25–31%.

One resultant three-ply product has a ream weight of 45 pounds (2.25 oz./sq. yd.); the caliper thickness is approximately 8 mils; the lengthwise and crosswise tensile strength are 10 (at least) and 2.5 pounds, respectively; and the elongation is 20–26%.

The bonded fabric product can be calendered if desired to further compact the structure and improve the uniformity of thickness. Temperatures and pressures should be low enough to avoid mutilation and cutting of the fibers. For example, the two-ply product described above was satisfactorily calendered by being passed through the nip of a pair of 18 inch diameter crowned steel rolls driven at a peripheral speed of 40 feet per minute. The surface temperature of the rolls was 230° F. The pressure was adjusted so as to reduce the caliper of the fabric from an average value of 6.5 mils to a value of 4.5 mils.

The improved nonwoven polyester fabric can be autogenously laminated to a preformed oriented polyester film. For example, a two-ply fabric was laminated to a "Mylar" polyester film of ½-mil thickness by passing said fabric and film through the pressing and heating drum apparatus previously described with a web from the carding machine interposed therebetween, and with the film on the inside in direct contact with the heating drum. This results in unification of the carded web or bat and autogenous bonding of the amorphous undrawn polyester fibers of said web to the fibers of the two-ply fabric as well as to the film at the points of contact of said amorphous fibers therewith. The film is of the "drawn" or oriented type and has an elevated softening temperature above that of the amorphous undrawn fibers of the carded bat or web, so that interbonding can be achieved at a temperature below the softening temperatures of the drawn fibers and of the film, avoiding impairment of the physical and electrical properties of the film. There is no interbonding between the film and the drawn fibers except that provided by the undrawn bonding fibers, and this facilitates flexibility and conformability. The "Mylar" polyester film is a product of the Du Pont Company and is produced from a polyester of ethylene glycol and terephthalic acid.

What is claimed as the invention is:

1. A composite film-fabric sheet comprising (1) a heat-pressed tissue-like fabric of heterogeneously interlaced drawn and undrawn staple unplasticized polyester fibers, said undrawn fibers being formed of the same polyester as said drawn fibers and having been converted from an initial relatively low softening amorphous state to a crystalline state affording substantially the same softening temperature range as that of the drawn fibers, said crystallized undrawn fibers being autogenously interbonded at their crossing points to form a network within which said drawn fibers are interlaced without being interbonded to each other, said fabric having a ream weight of about 15 to 60 pounds, and (2) a film of electrical insulating resin inseparably united to said fabric.

2. A composite sheet as defined by claim 1 wherein the electrical insulating resin is varnish.

3. A composite sheet as defined by claim 1 wherein the electrical insulating resin is a preformed oriented polyester film.

4. A composite flexible film-fabric sheet which can be wound on electrical coils with good conformation with substantially no loss of continuity of the resin impregnant to provide uniform electrical insulating characteristics over both stretched and relatively unstretched areas, said sheet comprising (1) a heat-pressed tissue-like fabric of heterogeneously interlaced drawn and undrawn staple unplasticized polyester fibers which both have a length of at least approximately one inch, said undrawn fibers being formed of the same polyester as said drawn fibers and having been converted from an initial relatively low softening amorphous state to a crystalline state affording substantially the same softening temperature range as that of the drawn fibers, said crystallized undrawn fibers being autogenously interbonded at their crossing points to form a network within which said drawn fibers are interlaced without being interbonded to each other, said fabric having a ream weight of about 15 to 60 pounds, and (2) a film of electrical insulating resin inseparably united to said fabric.

5. A composite sheet as defined in claim 4 wherein said polyester is polyethylene terephthalate, said electrical insulating resin is a preformed oriented polyethylene terephthalate film, and said drawn and undrawn fibers are each present in the proportion of about 40–60 percent by weight of total fiber.

6. A composite electrical insulating sheet of at least two plies comprising (1) a first heat-pressed fabric of heterogeneously interlaced drawn and undrawn staple unplasticized polyester fibers, said undrawn fibers being formed of the same polyester as said drawn fibers and having been converted from an initial relatively low softening amorphous state to a crystalline state affording substantially the same softening temperature range as that of the drawn fibers, said crystallized undrawn fibers being autogenously interbonded at their crossing points to form a network within which said drawn fibers are interlaced without being interbonded to each other, said first fabric having a ream weight of about 15 to 60 pounds, and (2) a second heat-pressed fabric of heterogeneously interlaced drawn and undrawn staple unplasticized polyester fibers of the same polyester as said drawn fibers of said first heat-pressed fabric, said undrawn fibers of the second fabric having been converted from an initial relatively low softening amorphous state to a crystalline state affording substantially the same softening temperature range as that of the drawn fibers, said crystallized undrawn fibers being autogenously bonded at their crossing points and to fibers of said first fabric, said second fabric having a ream weight of about 15 to 60 pounds.

7. A composite sheet as defined in claim 6 carrying a film of electrical insulating resin inseparably united thereto.

8. A composite film-fabric electrical insulating sheet comprising a preformed oriented polyester film and two layers of nonwoven fabric, each of said fabric layers being inseparably united to one surface of the film and comprising heat-pressed interlaced drawn and undrawn staple unplasticized fibers, said undrawn fibers being formed of the same polyester as said drawn fibers and having been converted from an initial relatively low softening amorphous state to a crystalline state affording substantially the same softening temperature range as that of the drawn fibers, said crystallized undrawn fibers being autogenously interbonded at their crossing points and bonded to said film at points of contact therewith, each of said fabrics having a ream weight of about 15 to 60 pounds.

9. A composite sheet as defined in claim 8 wherein the two layers of nonwoven fabric are impregnated with electrical insulating varnish.

10. A composite film-fabric sheet comprising (1) a heat-pressed tissue-like fabric of heterogeneously interlaced drawn and undrawn staple unplasticized polyester fibers consisting of polyethylene terephthalate, said undrawn fibers having been converted from an initial relatively low softening amorphous state to a crystalline state affording substantially the same softening temperature range as that of the drawn fibers, said crystallized undrawn fibers being autogenously interbonded at their crossing points to form a network within which said drawn fibers are interlaced without being interbonded to each other, said fabric having a ream weight of about 15 to 60 pounds, and (2) a film of electrical insulating resin inseparably united to said fabric.

11. A composite sheet as defined by claim 10 wherein said drawn and undrawn fibers are each present in the proportion of about 40–60 percent by weight of total fiber.

12. A composite electrical insulating sheet of at least two plies comprising (1) a first heat-pressed fabric of heterogeneously interlaced drawn and undrawn staple unplasticized polyester fibers consisting of polyethylene terephthalate, said undrawn fibers having been converted from an initial relatively low softening amorphous state to a crystalline state affording substantially the same softening temperature range as that of the drawn fibers, said crystallized undrawn fibers being autogenously interbonded at their crossing points to form a network within which said drawn fibers are interlaced without being interbonded to each other, said first fabric having a ream weight of about 15 to 60 pounds, and (2) a second heat-pressed fabric of heterogeneously interlaced drawn and undrawn staple unplasticized polyester fibers consisting of polyethylene terephthalate, said undrawn fibers of the second fabric having been converted from an initial relatively low softening amorphous state to a crystalline state affording substantially the same softening temperature range as that of the drawn fibers, said crystallized undrawn fibers being autogenously bonded at their crossing points and to fibers of said first fabric, said second fabric having a ream weight of about 15 to 60 pounds.

(References on following page)

References Cited by the Examiner

UNITED STATES PATENTS

| | | |
|---|---|---|
| 2,060,665 | 11/1936 | Durant et al. _____ 117—143 |
| 2,234,252 | 3/1941 | Homan _____ 117—86 |
| 2,388,319 | 11/1945 | Fuller. |
| 2,497,376 | 2/1950 | Swallow et al. |
| 2,503,024 | 4/1950 | Boese et al. _____ 156—35 |
| 2,676,128 | 4/1954 | Piccard _____ 161—156 |
| 2,725,309 | 11/1955 | Rodman. |
| 2,836,576 | 5/1958 | Piccard et al. _____ 154—46 X |

ALEXANDER WYMAN, *Primary Examiner.*

CARL F. KRAFFT, EARL M. BERGERT, W. F. ZAGURSKI, W. J. VAN BALEN, *Assistant Examiners.*